United States Patent [19]

Outwater et al.

[11] Patent Number: 5,103,674
[45] Date of Patent: Apr. 14, 1992

[54] LIQUID LEVEL INDICATOR FOR HIGH PRESSURE, HOSTILE ENVIRONMENT

[75] Inventors: John O. Outwater, Boston; Gordon F. Kohse, Arlington; Michael J. Driscoll, Cambridge; Otto K. Harling, Hingham, all of Mass.

[73] Assignee: Massachusetts Institute of Technology, Cambridge, Mass.

[21] Appl. No.: 629,723

[22] Filed: Dec. 17, 1990

[51] Int. Cl.⁵ ............... G01F 23/56; G01F 23/60; G01F 23/62
[52] U.S. Cl. ............... 73/319; 73/DIG. 5; 73/313; 73/322.5; 376/258
[58] Field of Search ............... 73/319, 322.5, DIG. 5, 73/305, 314, 313; 376/258

[56] References Cited

U.S. PATENT DOCUMENTS

| | | | |
|---|---|---|---|
| 340,456 | 4/1886 | Phelps | 73/319 |
| 362,719 | 5/1887 | Campbell | 73/319 |
| 443,063 | 12/1890 | Allen | 73/319 |
| 671,858 | 4/1901 | Devantery | 73/319 |
| 986,210 | 3/1911 | Pearson | 73/DIG. 5 |
| 1,040,127 | 10/1912 | Bonesteel | 73/319 |
| 2,233,235 | 2/1941 | Witthaus | 73/319 |
| 2,564,305 | 8/1951 | Hicks | 73/322.5 |
| 2,685,797 | 8/1954 | Morschel | 73/319 |
| 2,934,953 | 5/1960 | Anderson | 73/319 |
| 3,662,598 | 5/1972 | Spencer | 73/861.05 |
| 4,081,638 | 3/1978 | Thorn et al. | 73/322.5 |
| 4,291,575 | 9/1981 | Frissora | 73/302 |
| 4,483,193 | 11/1984 | Bonetti | 73/319 |
| 4,870,862 | 10/1989 | Bonetti | 73/322.5 |

FOREIGN PATENT DOCUMENTS

| | | | |
|---|---|---|---|
| 1084931 | 7/1960 | Fed. Rep. of Germany | 73/314 |
| 0000522 | 1/1982 | Japan | 376/258 |
| 0230644 | 4/1944 | Switzerland | 73/319 |
| 0295717 | 3/1954 | Switzerland | 73/319 |
| 0360220 | 3/1962 | Switzerland | 73/319 |
| 0779813 | 11/1980 | U.S.S.R. | 73/305 |
| 0269782 | 4/1927 | United Kingdom | 73/DIG. 5 |
| 1211195 | 11/1970 | United Kingdom | 73/DIG. 5 |

*Primary Examiner*—William A. Cuchlinski, Jr.
*Assistant Examiner*—Diego F. F. Gutierrez
*Attorney, Agent, or Firm*—Fish & Richardson

[57] ABSTRACT

A method of measuring the level of a corrosive, high-pressure, high-temperature liquid in a closed container of a nuclear reactor, by providing a generally tubular structure connected to the closed container of the nuclear reactor so that the level of liquid in the tubular structure is indicative of the level of liquid in the closed container, providing a sealed buoyant float sized to move vertically up an down within the tubular structure, the float being formed of beryllium, detecting from outside the tubular structure the vertical position of said buoyant float, the position corresponding to the level of liquid in the closed container.

1 Claim, 2 Drawing Sheets

LIQUID LEVEL INDICATOR FOR HIGH PRESSURE, HOSTILE ENVIRONMENT

BACKGROUND OF THE INVENTION

This invention relates to liquid level indication devices.

There is a need for improved liquid level indication devices suitable for use in nuclear reactors and other hostile environments (e.g., corrosive and/or high radiation environments) subject to high temperature (e.g., 300° C.) and high pressure (e.g., 1000-2000 psi) conditions. One conventional level sensor used in such environments is a rod along which a plurality of thermocouple-based sensors are positioned. Devices employing buoyant floats have also been attempted. For example, U.S. Pat. No. 4,870,862 discloses a device having an internally-pressurized titanium float, in which a magnetically permeable material such as iron has been inserted. Electro-magnetic coils surrounding the chamber in which the float travels provide an indication of the height of the float.

SUMMARY OF THE INVENTION

It has been discovered that the best material for a buoyant float for a liquid level indicator in such high-pressure, hostile environments, is one constructed of a high modified specific stiffness defined as modulus/(density)$^3$, (i.e., greater than $10^{10}$ in$^7$/lb$^2$) and high corrosion resistance material. One such material is glass. Despite the fragility and low strength of glass, it turns out to be a much better material for this application than stronger materials such as, for example, stainless steel.

Sealed, buoyant floats of high modified specific stiffness can be made very light (relative to water and other liquids) and yet still withstand extremely high pressures and temperatures, even in a corrosive environment. Such floats are easily fabricated and are useful for both a liquid-vapor or a liquid-liquid interface.

In preferred embodiments, the float has a modified specific stiffness of greater than $1.5 \times 10^{10}$ in$^7$/lb$^2$ and fused silica is used. In nonradioactive applications, borosilicate glass (e.g., Pyrex ®) can be used instead of fused silica. Another excellent material meeting the necessary stiffness and corrosion resistance properties is beryllium.

Other features and advantages of the invention will be apparent from the following description of a preferred embodiment and from the claims.

DESCRIPTION OF THE PREFERRED EMBODIMENT

A sealed, buoyant glass float used for measuring the liquid height inside a nuclear reactor, or other high-temperature, high-pressure, hostile environment, is able to withstand extremely high temperatures and external pressures without failure. The temperature of the liquid in the reaction vessel is about 300° C., and the pressure can get as high as 2000 psi. For most materials, strength and modified specific stiffness (strength/(density)$^3$) are comparable properties, a material of high strength also having high modified specific stiffness. However, the glasses, as not very dense materials, are an exception to this general rule, exhibiting high modified specific stiffness while being relatively fragile to abrupt blows. It appears that, unexpectedly, a sealed glass float has such a high modified specific stiffness that it remains stable and does not deform enough to shatter under the high pressures in the reactor vessel even though the inside of the float is at a much lower pressure than the outside.

By proper selection of material, the float can be made essentially immune to radioactivity. The height of the float in the liquid containing vessel is measured by electromagnetic sensors that detect the position of an iron wire enclosed within the float.

Figure 1:
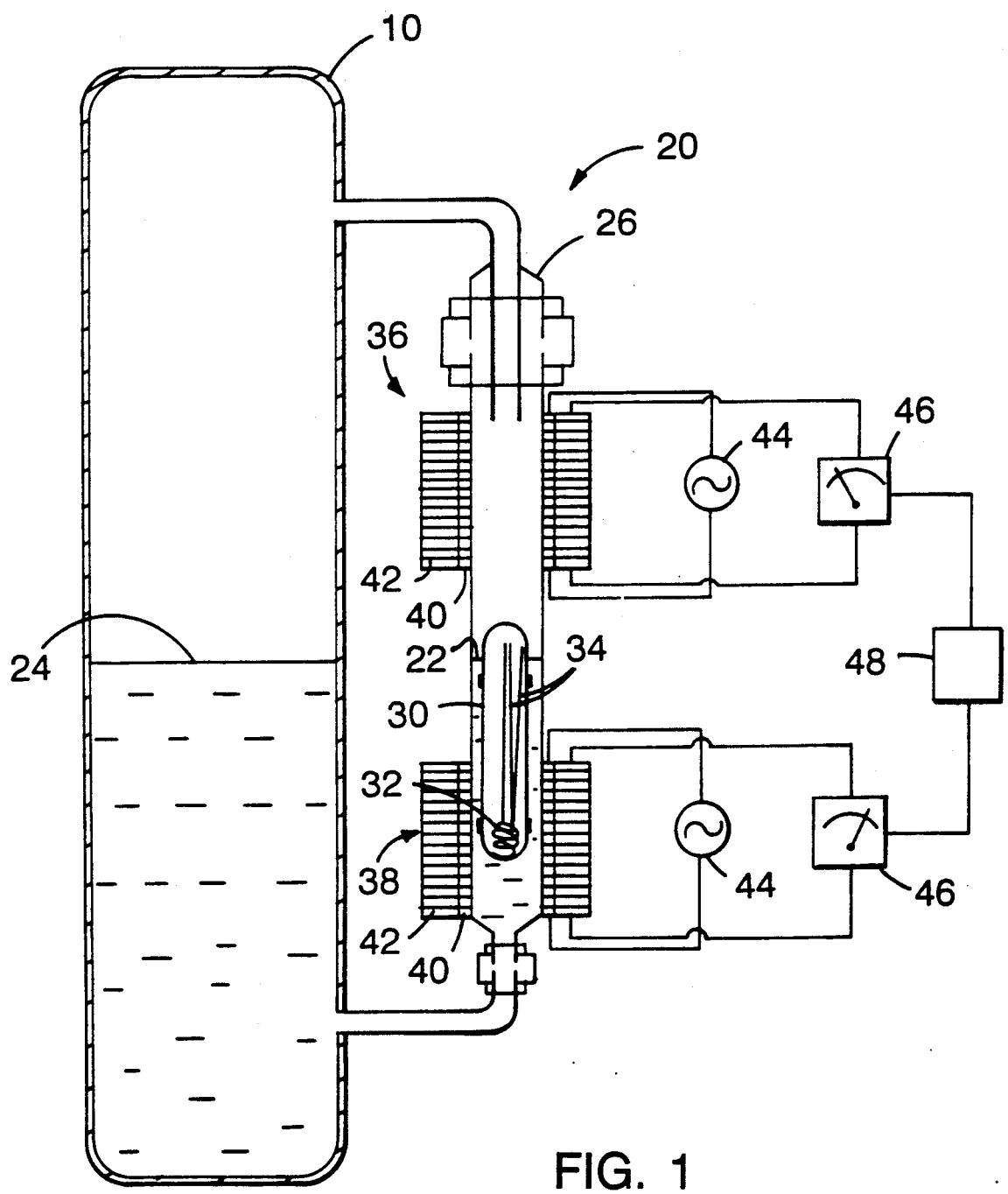
FIG. 1 is an elevation view, somewhat diagrammatic, of the preferred embodiment of the invention.
Figures 2A, 2B, 2C, 2D:
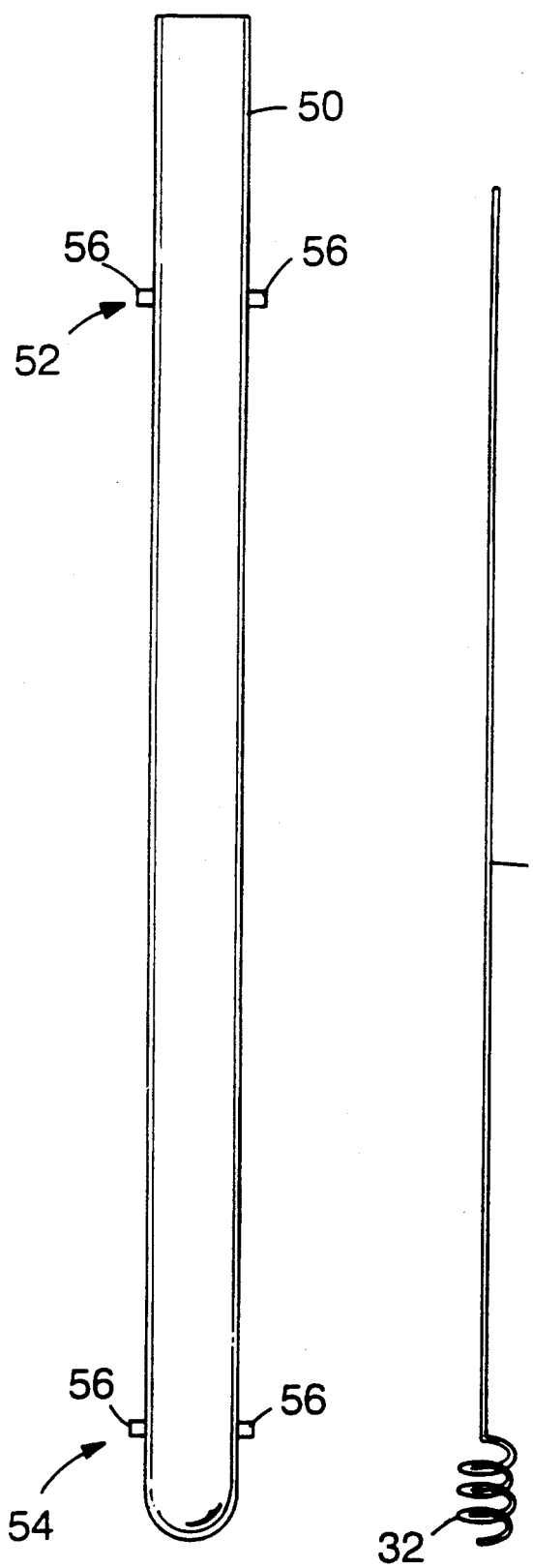
FIGS. 2A, 2B, 2C, 2D are diagrammatic views showing the steps followed in manufacturing the float.

Referring to FIG. 1, a nuclear reactor pressure vessel 10 has attached a liquid level indicator device 20, in which the liquid level 22 is the same as the level 24 of the liquid in the main reactor vessel 10. Indicator device 20 consists of a metal tube 26 in which is floating a buoyant glass tube 30 containing a non-magnetic coil weight 32 and a magnetically permeable iron rod 34. Exterior to the metal tube are upper 36 and lower 38 magnetic coil assemblies, consisting of a primary coil 40 surrounded by a secondary coil 42. When the primary coils are excited (by 60 Hz a.c. current), the voltages induced in the respective secondary coils are proportional to the vertical position of the iron wire 34 of float 30 within the respective coil assemblies 36, 38. Since the position of float 30 changes with changing liquid level 22, the voltage signal measurements 46 are combined to give a signal 48 indicative of the level of the float within the indicator device and, thus, the liquid level in the main reactor vessel.

The steps followed in manufacturing the float are shown in FIGS. 2A-2D. Glass float 30 is made from a fused silica tube by the following procedure. To the outside of a fused silica tube 50 (21.5 cm × 10 mm × 0.47 mm wall) are fused two rows 52, 54 of six 1/16" high fused silica bumps 56 each, around the circumference of tube 50, one near the top 52 and one near the bottom 54. Referring again to FIG. 1, the bumps 56 prevent the float 30 from sticking, by surface tension, to the wall of metal tube 26 of the level indicator.

Next is prepared a coil 32 of 1/16" o.d., type 304 stainless steel tubing, with a long tail 33, the coil weighing approximately 3-4 g. Coil 32 provides ballast in the bottom of float 30, to insure that the float will remain upright rather than tip sideways. The coil also provides weight to prevent float 30 from being held out of the liquid by surface tension forces as the liquid level drops in the level indicator. The long tail attached to the coil prevents the coil weight from sliding down the glass tube and cracking the end of it if float 30 is inverted.

The iron rod 34, which couples the detector coils and allows position sensing, is made from a 16" length of 24 gauge (0.0201" diameter) pure iron wire. The wire is bent double, so that its overall length is 8".

Iron rod 34 and stainless steel coil weight 32 are then inserted into test tube 50, and the tube is sealed off at the end in a methane-oxygen flame. The overall length of the resultant float 30 is approximately 21.5 cm, and its total weight is approximately 11.5 gm.

The diameter of the tubing used to prepare float 30 is not critical; the only requirement is that the walls of the tubing be thin enough that the finished device will float in high temperature water. The required length of the finished float is determined by the dimensions of the magnetic coil assemblies. Weight 32 must be of nonmagnetic material and should be concentrated at the end of the float. Stainless tubing is one convenient option. Iron rod 34 can be made from multiple wires, as the above design states, or may be a single wire.

The finished float should remain suspended in the liquid with its upper end approximately 1" above the surface when floated in methanol (which has nearly the same density as 285° C. water). This can be tested before the tube is sealed, and the weight adjusted accordingly.

Other embodiments are within the following claims. For example, as the key criteria for the material of the float are high modified specific stiffness combined with good corrosion resistance, a borosilicate glass could be used in non-radioactive environments.

The glass float could be surrounded by a thin sheath constructed of stainless steel (or other nonmagnetic material) to contain shards of glass in the unlikely event of fracture. Small weep holes could be supplied in the stainless steel sheath to equalize pressure on its outside and inside. The float could also be plated with a corrosion-resistant film.

Other materials which meet the modified specific stiffness criterion include silicon, aluminum, magnesium, and beryllium. Silicon has several disadvantages, including that of cost relative to fused silica or borosilicate glass, (e.g., Pyrex ®). Aluminum has not quite the stiffness, corrosion resistance, or high temperature strength of glass, but would be satisfactory for many uses. Magnesium would be somewhat stronger than glass and aluminum, but with the same temperature and corrosion drawbacks of aluminum.

Beryllium is ideal in many respects. It is extremely light (density of 1.85 versus 2.2 for silica); it is four times stiffer than silica, and has a very high melting point. It is highly corrosion resistant and is also highly resistant to all forms of nuclear radiation. While it is expensive, it is not brittle and would not shatter upon failure.

Other methods to detect the level of the float within the reaction vessel include a magnetic device in which a magnet is attached to the glass float. When the liquid level rises in the vessel, the magnet comes in proximity to a reed switch, causing the switch to close.

Other commercial applications of the float include level measurement in steam generators, in fossil fuel electric generating plants, and in the chemical, petroleum, and food-processing industries.

We claim:

1. A method of measuring the level of a corrosive, high-pressure, high-temperature liquid in a closed container of a nuclear reactor, said method comprising the steps of:
   providing a generally tubular structure connected to said closed container of said nuclear reactor so that the level of liquid in the tubular structure is indicative of the level of liquid in the closed container,
   providing a sealed bouyant float sized to move vertically up and down within said tubular structure, said float being formed of beryllium,
   detecting from outside said tubular structure the vertical position of said bouyant float, said position corresponding to said level of liquid within said closed container.

* * * * *

UNITED STATES PATENT AND TRADEMARK OFFICE
CERTIFICATE OF CORRECTION

PATENT NO. : 5,103,674
DATED : April 14, 1992
INVENTOR(S) : John O. Outwater, Gordon E. Kohse, Michael J. Driscoll, and Otto K. Harling It is certified that error appears in the above-indentified patent and that said Letters Patent is hereby corrected as shown below:

Front page, section [75] Inventors, "Gordon F. Kohse" should be --Gordon E. Kohse--.

Signed and Sealed this

Thirteenth Day of July, 1993

Attest:

MICHAEL K. KIRK

Attesting Officer

Acting Commissioner of Patents and Trademarks